April 19, 1966 G. KRSEK 3,247,446
HIGH VOLTAGE RECTIFIER
Filed Nov. 17, 1961 3 Sheets-Sheet 1
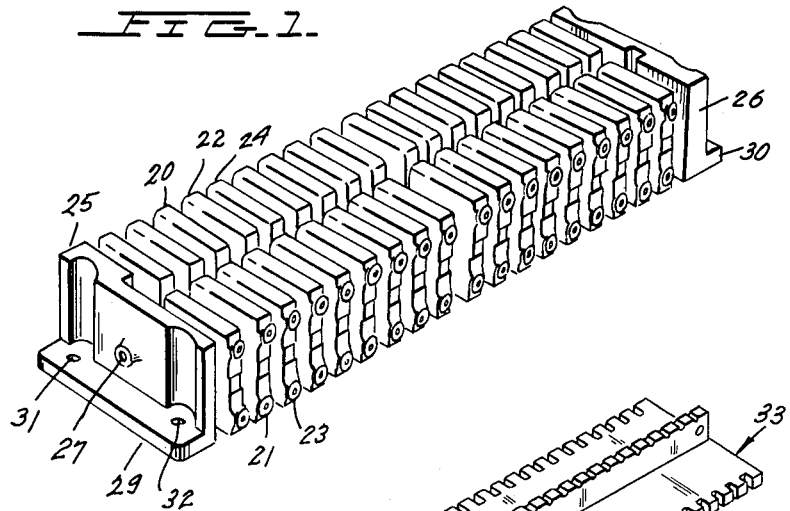
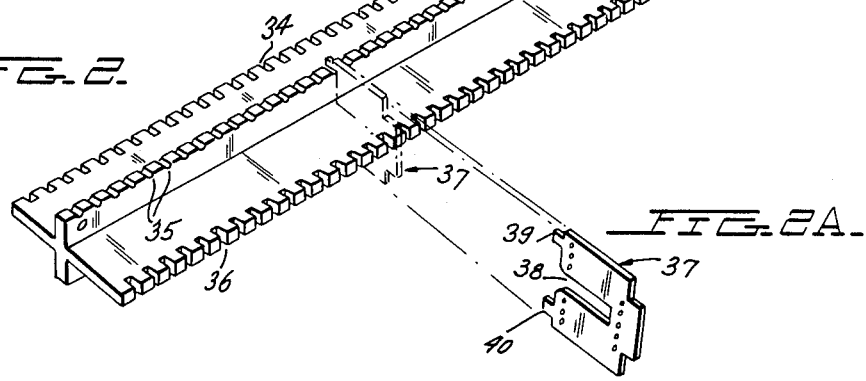
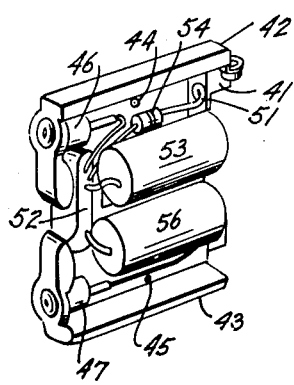
INVENTOR.
GEORGE KRSEK
BY
OSTROLENK, FABER, GERB & SOFFEN
ATTORNEYS April 19, 1966          G. KRSEK          3,247,446
HIGH VOLTAGE RECTIFIER
Filed Nov. 17, 1961          3 Sheets-Sheet 2
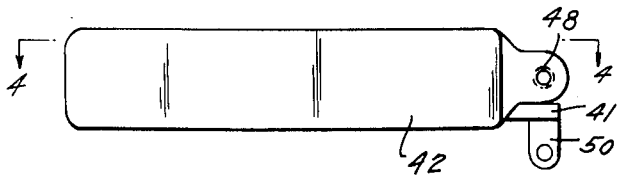
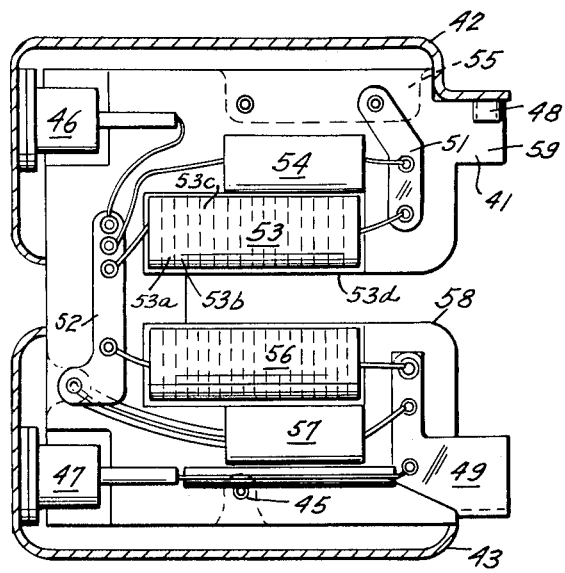
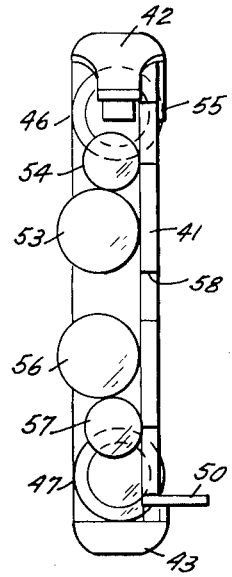
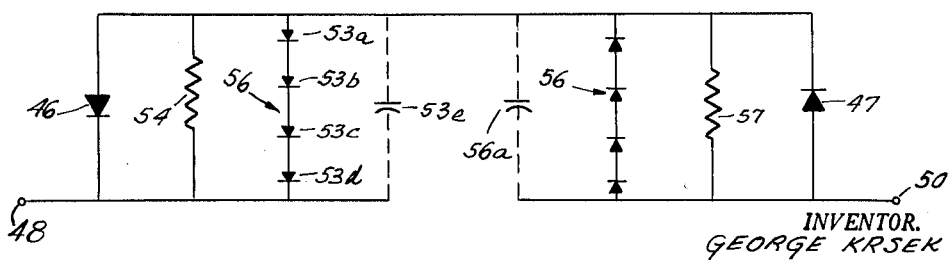
INVENTOR.
GEORGE KRSEK
BY
OSTROLENK, FABER, GERB & SOFFEN
ATTORNEYS

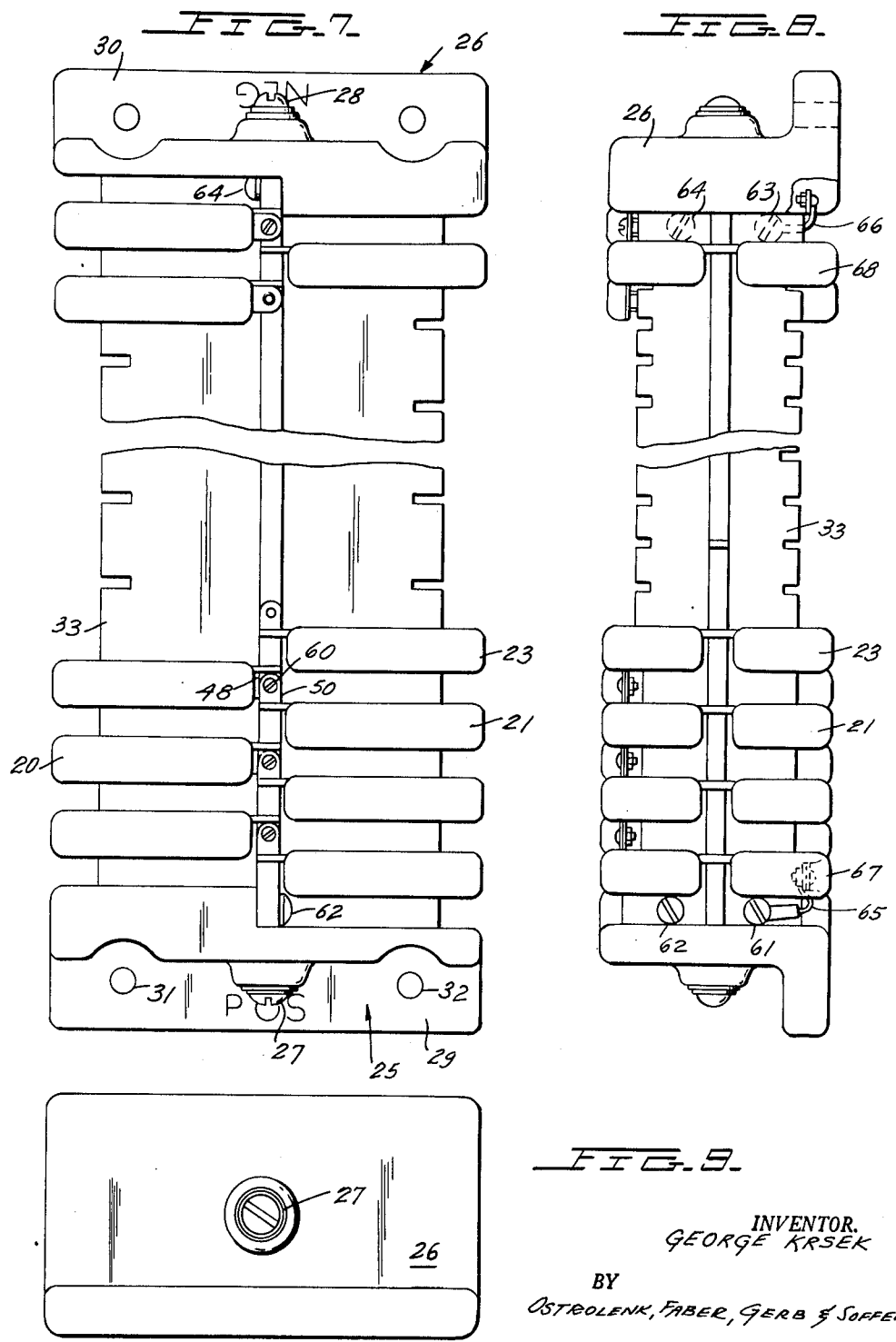

`United States Patent Office`

3,247,446
Patented Apr. 19, 1966

3,247,446
HIGH VOLTAGE RECTIFIER
George Krsek, Los Angeles, Calif., assignor to International Rectifier Corporation, El Segundo, Calif., a corporation of California
Filed Nov. 17, 1961, Ser. No. 153,155
1 Claim. (Cl. 321—14)

My invention relates to high voltage rectifier assemblies, and is more specifically related to an improvement of the high voltage rectifier system of the type shown in copending application Serial No. 105,729, filed April 26, 1961, entitled, "High Voltage Rectifier Structure," in the name of Edward J. Diebold, and assigned to the assignee of the present invention, wherein the rectifier elements of each of the rectifier modules which are connected in series to form a high voltage rectifier system have a small stack of selenium rectifier plates in parallel therewith.

High voltage rectifier systems can be formed of a plurality of sub-assemblies which each contain a rectifier and voltage divider network with the sub-assemblies connected in series to form a high voltage rectifier system. The voltage division means which normally include a resistor and capacitor in parallel with the respective rectifier element are effective for forcing equal voltage distribution across each of the series connected modules in the rectifier chain. The resistor-capacitor circuit is not, however, able to limit the voltage magnitude applied to the individual rectifier cells when the series chain is exposed to an excessively high voltage. Thus, one or more of the rectifier cells may fail under extremely high voltage conditions which could lead to a complete failure of the entire structure by successive break-down of the individual rectifier cells.

The present invention provides means whereby there will be voltage division between the rectifier cells in the usual manner, but the energy of over-voltage transients is carried away without damaging the rectifier cells.

More specifically, the invention contemplates the connection of a small stack of selenium rectifier plates which could be contained within a cartridge housing in parallel with each of the rectifier devices. These cartridges are made sufficiently small to fit respective individual modules and will have a reverse break-down voltage which is above the rated voltage of the rectifier cell being protected, but below the test voltage of the rectifier cell being protected. By way of example, a typical rectifier cell rated at 600 volts peak may be tested at 850 volts peak. The break-down voltage of the cartridge of selenium rectifier plates will then be between the 600 and 850 volt peak value. Therefore, when the semiconductor rectifier device is subjected to an excessive voltage, a substantial reverse current will flow through the cartridge of selenium plates, whereby the voltage across the cell is decreased to safe values during the transient excessive voltage condition.

The cartridge can consist of a large number of small selenium rectifier plates in a common case. The number of plates which typically could be 20 to 30 would depend upon the required break-down voltage for the selenium cartridge. Since the plates have an extremely low rated current, the plates will be very small in area.

During break-down of the selenium cartridge and, thus, protection of the main rectifier cell, the reverse current through the selenium plates will create a substantial amount of heat which will be stored in the plates. Since the voltage surges to be protected against are essentially of low energy and are non-repetitive, they will not create a sufficient amount of heat to overheat the relatively massive selenium plates and the accumulated heat will have time to dissipate in the interval between surges.

As an unexpected advantage of the invention, I have found that by appropriate design of the selenium plates and cartridge, the substantial capacitance existing in the stacked plates may be sufficient for use as the voltage balancing capacitor of a typical capacitor-resistor balancing circuit.

One great advantage of the novel invention is that it is now possible for the designer of the system to select a substantially reduced rated voltage for the main rectifier cells with respect to the rated voltage of the system. Thus, present design techniques call for high voltage rectifier assemblies where the rectifier elements have rated peak voltages which are 2.5 to 3.5 times the rated peak reverse voltage of the system. This, of course, requires a predetermined large number of rectifier devices connected in series for a given system.

With the use of the surge suppressing selenium cartridge of the invention, however, such large safety margins are not needed, and it will be possible to save 30% to 50% of the rectifier devices in a given chain of rectifier cells which would also mean a saving in the number of modules to be used, the number of voltage dividing elements which are needed, and the supporting hardware for the complete system. Simultaneously, a saving of 30% to 50% of the power loss of the system will be possible, since forward current flow is through fewer series connected rectifier cells.

A further advantage exists under transient voltage conditions wherein the surge suppressing selenium cartridge will force a voltage clipping effect on the individual modules which are subjected to sudden over-voltages due to unequalized switching, transient or induced localized over-voltages, as due to a travelling wave travelling along the series connected chain of cells.

Accordingly, a primary object of this invention is to provide a novel cell-protecting means for series connected rectifier cells which form a high voltage rectifier system.

Another object of this invention is to permit a reduction in the required number of rectifier cells in a high voltage rectifier system.

A further object of this invention is to provide a novel protective means in a series connected chain of rectifier cells which protects the cells under excessive transient voltage conditions.

A further object of this invention is to provide a stack of low current rating selenium plates in parallel with a high current rating rectifier cell to protect the high current rectifier cell from excessive reverse voltage.

A further object of this invention is to replace the voltage dividing capacitor of a voltage dividing the network for series connected rectifier cells by a stack of selenium plates which provide capacitance for voltage balancing functions and further provide excessive over-voltage protection.

These and other objects of my invention will become apparent from the following description when taken in connection with the drawings, in which:

FIGURE 1 shows a perspective view of a rectifier assembly which can utilize the protective selenium cartridges of the invention.

FIGURE 2 shows the central support beam of the rectifier assembly of FIGURE 1 with a single module board connected thereto.

FIGURE 2a is a perspective view of the module board of FIGURE 2.

FIGURE 3 shows the module board of FIGURE 2a with its various components including the selenium cartridge mounted thereon in perspective view.

FIGURE 4 is a front view of the module board of FIGURE 3.

FIGURE 4a is an electrical schematic diagram of the components mounted on the module board of FIGURES 3 and 4.

FIGURE 5 is a side view of the module board of FIGURE 4 as seen from the right-hand side of FIGURE 4.

FIGURE 6 is a top view of the module board of FIGURE 4.

FIGURE 7 is a top view of the rectifier assembly of FIGURE 1.

FIGURE 8 is a side view of FIGURE 7.

FIGURE 9 is a front view of the rectifier assembly of FIGURES 1, 7 and 8.

Referring first to the embodiment shown in FIGURES 1 through 6, and more specifically to FIGURE 1, a complete rectifier assembly is formed of a plurality of modules which each contain rectifier elements, voltage balancing structures for the rectifier elements, and the novel selenium cartridge. The modules such as modules 20, 21, 22, 23 and 24 are stacked in adjacent relationship with respect to one another with alternate modules being on opposite sides of the center of the mounting frame. Thus, modules 20, 22 and 24 are on one side, while modules 21 and 23 are on the other side of a center through the assembly. The adjacent modules, however, are so arranged that their internal rectifier elements are connected in series to define a long string of individual rectifier elements connected in series between a first end shield 25 and a second end shield 26. End shields 25 and 26 are of conductive material and have centrally located terminals 27 and 28 respectively (FIGURES 7 and 8) to serve as terminals for the rectifier assembly. The end shields 25 and 26 are also provided with extending mounting pads 29 and 30 respectively which have openings therein such as openings 31 and 32 in mounting pad 29 to serve as means for mounting the rectifier assembly.

The main support member for the rectifier assembly of FIGURE 1 is shown in perspective view in FIGURE 2 as being comprised of a central beam 33 which has an X-shaped cross-section and can, for example, be made of a polyester fiberglass.

The outer edges of the beam are notched with a plurality of notches such as notches 34, 35 and 36, which notches will serve, as will be seen more fully hereinafter, to receive the insulating mounting boards of the various modules to be assembled on beam 33. Thus, in FIGURE 2 I have shown a module board 37 as mounted on beam 33. Module board 37 is further shown in FIGURE 2a as having a centrally located slot 38 to cause the module board to have a U-shape. The upper ends of the legs of the U-shaped module board are then provided with extending tongue sections 39 and 40.

In assembling the board on beam 33, it will be clear that the extending length of beam 33 receives slot 38. The extending tongue members 39 and 40 are then received into appropriate notches at either end of the vertical portion of beam 33 with the bottom of slot 38 falling into the notch at one end of the horizontal portion of beam 33. Thus, the panel 37 is automatically located in a predetermined position on beam 33 to simplify the assembly of the device, as will be described more fully hereinafter.

Each of the individual modules of the device such as modules 21 through 24 of FIGURE 1 are constructed in an identical manner, each of the modules having an insulating support of the type shown in FIGURE 2a.

The module construction of one of the typical module devices is best shown in FIGURES 3, 4, 4a, 5 and 6. Referring to these figures, I show the module as having a support base 41 which is identical to base 37. Base 41 is the main supporting member of the module, and may be a polyester glass board which receives all of the component parts of the module. Thus, the board first has an upper shield 42 and lower shield 43 secured thereto as by rivets 44 and 45 respectively which extend from the insulating board 41 to the shields 42 and 43. The shield 42 has a rectifier cell 46 connected thereto at one of its electrodes as by soldering or any other desired fastening means, while, in a like manner, shield 43 has rectifier cell 47 secured thereto at one end of its electrodes. The upper shield 42 has a conductive eyelet 48 extending therefrom to serve as one terminal for the module, while the other terminal of the module is formed of an L-shaped conductive strip 49 which is riveted to board 41 and has a leg 50 extending therefrom. It will be noted that conductive strip 49 is insulated from shield 43.

The board 41 has further terminal members 51 and 52 secured thereto as by rivet means. A first cartridge 53 and first resistor 54 are then provided for rectifier cell 46, and are connected in parallel with rectifier 46. The cartridge 53 and resistor 54 are supported by their leads. Thus, the left-hand lead of resistor 54, the left-hand lead of cartridge 53, and the conductive lead leading from the second terminal of rectifier cell 46 are all connected to conductive strip 52. The right-hand leads of resistor 54 and cartridge 53 are then connected to conductive strip 51 which is, in turn, electrically connected to a downwardly projecting portion 55 of shield 42.

In a similar manner, a cartridge 56 and resistor 57 are provided for rectifier cell 47 with their left-hand leads being connected to conductive strip 52 and their right-hand leads being connected to conductive strip 49. The second electrode of rectifier cell 47 is also connected to conductive strip 49.

The cartridges 53 and 56 are shown in FIGURE 4, and comprise a stack of individual selenium plates such as plates 53a, 53b and 53c for cartridge 53. These plates are contained within an insulation housing 53d which has the leads from the two outer plates extending therethrough for connection to outer circuit components.

In FIGURE 4a I have schematically illustrated cartridges 53 and 56 as including a series of small rectifier cells as defined by the plurality of plates. The actual number of plates in cartridges 53 and 56 could, for example, be from 20 to 30 plates, depending upon the point at which break-down under reverse voltage direction is desired.

The electrical circuit thus defined by the module of FIGURES 3 through 6 is shown in FIGURE 4a, and is comprised of a circuit which, beginning at terminal 48, includes rectifier cell 46 which has resistor 54 and selenium cartridge 53 in parallel therewith. This parallel connected group of components is connected in series with a similar parallel connected group of components 47, 56 and 57 which terminate at terminal 50.

It is commonly known that for effective voltage balancing, a parallel capacitor should be provided for each of the cells, as well as a resistor such as resistors 54 and 57. As an unexpected advantage of the invention, I have found that the capacitance between the plates of a typical selenium cartridge is sufficient to serve the purposes of the voltage balancing capacitor for the respective cells. Thus, cartridge 53 has an inherent capacitance schematically illustrated as capacitor 53e which is of sufficient magnitude to cause predetermined voltage division between the series connected cells such as cell 46 and 47 under rapid rising voltage conditions. In a similar manner, distributed capacitance 56a of cartridge 56 serves as the voltage dividing capacitor for cell 47.

The board 51 then has the slot 58 therein for receiving an extending section of beam 33, while its extending tongue portions such as tongue portion 59 are received in grooves in the beam to automatically physically locate the module on the beam.

The individual modules are then assembled on beam 33, as illustrated in FIGURES 7 and 8, where those modules such as modules 21 and 23 to the right of the beam are merely slid into their appropriately predetermined positions as determined by the notches in the beam, while the modules such as module 20 are rotated by 180° with respect to modules 21 and 23, and are similarly inserted on the beam 33. That is to say, the module boards are so arranged on alternate sides of the beam so that the extending terminal 50 of a module such as module 21 will be adjacent an eyelet such as eyelet 48 of module 20.

By now appropriately securing the respective eyelets 48 and extending terminals 50 of the adjacent modules as by a screw means such as screw 60 or other appropriate connecting means, the modules such as modules 20 and 21 are inherently connected in series with one another and are secured to the beam 33. In a similar manner, each of the remaining modules are electrically connected to one another and mechanically secured to the board 33 along its complete length.

In the embodiment of FIGURES 7 and 8, a total of 50 modules, for example, are used so that a total of 100 rectifier cells are connected in series with one another to define an exceedingly high voltage assembly, the current capacity of which is determined by the current capacity of any of the individual cells.

The end shields 25 and 26 previously described are then secured to the ends of beam 33 as by screws 61–62 and 63–64 respectively where the screws pass through the beam 33 and terminate in electrically conductive relationship with respect to the conductive shields. The last module can, therefore, be electrically connected to its adjacent shield by an electrical jumper such as jumpers 65 and 66 where jumper 65 connects end shield 25 to the first module 67 of the stack of FIGURE 8, while jumper 66 connects the other end of module 68 to end shield 26.

With the construction as described above, the rectifier elements form a string of series connected rectifier cells where each of the cells is shunted by a respective resistor and a capacitor where the capacitor is either formed by the distributed capacitance of the selenium cartridges, or, if desired, by an external capacitor. Moreover, all of the metallic parts of the rectifier column are held at a specific potential within the column, which potential changes gradually by equal steps from terminal 27 along the stack to terminal 28.

An unusual feature of the novel construction is that the reliability of the overall assembly is greater than the reliability of the individual components. In the event that a single cell within the stack fails, the resistor and capacitor voltage divider associated with the cell will permit its reverse voltage to collapse without upsetting the voltage division of the other cells. This collapse of reverse voltage prevents the flow of excessive reverse current through the cell which fails. Thus, a failed cell is not completely destroyed and mechanically opened, but rather remains a conductor which permits the current to continue flowing through the string. Where a sufficient number of identical cells are used, it will be apparent that the failure of a single cell will not affect the performance of the column of cells which remain. Therefore, the reliability of the entire column is greater than the reliability of its parts.

The shunting resistor of each of the groups of cells provides voltage division between the cells under normal voltage conditions in the usual manner. The shunting capacitors are provided for each of the cells to provide voltage division under transient voltage conditions in the usual manner. Clearly, the novel selenium cartridges of the invention operate to protect their respective cells by breaking down in the reverse direction when transient voltage conditions, even though balanced between the cells, are excessively high for the cell rating.

With regard to other high voltage effects, it will be seen that each of the modules is provided with individual conductive shields which serve as a heat sink for their respective rectifier, but also serve as a part of a continuous shield for the complete device. The two end shields of the device are then matched to the individual cell shields to give the column its unified appearance and unified performance as a single electrode device. Each of the shields are held at intermediate potentials by the voltage dividing network, and do not have sharp corners or discontinuities, thus eliminating corona and other gas discharge effects.

In a preferred embodiment of the invention, the highest gradient in open space will be held below 10 volts per mil. Moreover, creepage distances along the insulating material will be held below 2,000 volts per inch for normal operation, and below 4,000 volts per inch under transient conditions.

The complete rectifier system of FIGURE 1 may then be mounted in any desired manner, and could, for example, be contained within an ambient insulation such as air, compressed gas, or oil, as is well known to the art. The single electrode appearance of the device simplifies the insulator mountings for mounting the device within a container.

Although I have described preferred embodiments of my novel invention, many variations and modifications will now be obvious to those skilled in the art, and I prefer therefore to be limited not by the specific disclosure herein but only by the appended claim.

I claim:

In a high voltage rectifier system comprising a plurality of rectifier cells; an elongated support beam of insulating material having an outwardly extending side and a plurality of insulating boards; each of said insulating boards having a first and second series connected rectifier cell mounted thereon and a first and second stack of selenium rectifier plates connected in parallel with said first and second rectifier cells respectively; each of said insulating boards having a respective slot extending thereon; each of said slots of each of said insulating boards receiving said outwardly extending side to mount said insulating boards and their said rectifier cells on said support beam; the outer end of said outwardly extending side having notches spaced therealong; said notches receiving the bottom of respective slots of said insulating boards to axially position said insulating boards from one another; said stack of selenium rectifier plates conducting a relatively small reverse current at reverse voltages lower than the rated reverse voltage of said cell; said stack of selenium rectifier plates conducting a relatively large reverse current when the reverse voltage on said stack is above the rated voltage of said cell and below the test voltage of said cell.

References Cited by the Examiner

UNITED STATES PATENTS

| | | | |
|---|---|---|---|
| 2,454,846 | 11/1948 | Skinker | 317—234 |
| 2,894,077 | 7/1959 | McCoy | 317—101 |
| 2,918,612 | 12/1959 | Parrish | 317—234 |
| 2,969,494 | 1/1961 | Davis | 321—11 |
| 2,976,510 | 3/1961 | Blain | 317—101 |
| 3,059,165 | 10/1962 | Meykar | 321—8 |
| 3,069,613 | 12/1962 | Enns et al. | 321—11 |

FOREIGN PATENTS 231,743  12/1960  Australia.

MILTON O. HIRSHFIELD, *Primary Examiner.*

LLOYD McCOLLUM, *Examiner.*